US011897731B2

(12) United States Patent
Geisshüsler et al.

(10) Patent No.: US 11,897,731 B2
(45) Date of Patent: Feb. 13, 2024

(54) BRAKE DEVICE, E.G. WITH AN ECCENTRIC ELEMENT, FOR BRAKING A TRAVELING BODY THAT CAN BE MOVED IN A GUIDED MANNER ALONG A GUIDE RAIL IN A MOVEMENT DIRECTION

(71) Applicant: Inventio AG, Hergiswil (CH)

(72) Inventors: Michael Geisshüsler, Sursee (CH); Faruk Osmanbasic, Sins (CH); Adrian Steiner, Inwil (CH); Julian Stähli, Meggen (CH); Heinz Widmer, Affoltern am Albis (CH); Volker Zapf, Kriens-Obernau (CH)

(73) Assignee: INVENTIO AG, Hergiswil (CH)

( * ) Notice: Subject to any disclaimer, the term of this patent is extended or adjusted under 35 U.S.C. 154(b) by 61 days.

(21) Appl. No.: 17/756,914

(22) PCT Filed: Dec. 11, 2020

(86) PCT No.: PCT/EP2020/084114
§ 371 (c)(1),
(2) Date: Jun. 6, 2022

(87) PCT Pub. No.: WO2021/115845
PCT Pub. Date: Jun. 17, 2021

(65) Prior Publication Data

US 2023/0012252 A1 Jan. 12, 2023

(30) Foreign Application Priority Data

Dec. 12, 2019 (EP) .................................... 19215737

(51) Int. Cl.
*B66B 5/20* (2006.01)

(52) U.S. Cl.
CPC ..................................... *B66B 5/20* (2013.01)

(58) Field of Classification Search
CPC .... B66B 5/16; B66B 5/18; B66B 5/20; B66B 5/22
See application file for complete search history.

(56) References Cited

U.S. PATENT DOCUMENTS

2017/0240381 A1 8/2017 Terry et al.

FOREIGN PATENT DOCUMENTS

WO 2005044709 A1 5/2005
WO 2011078848 A1 6/2011
(Continued)

*Primary Examiner* — Michael A Riegelman
(74) *Attorney, Agent, or Firm* — William J. Clemens; Shumaker, Loop & Kendrick, LLP

(57) ABSTRACT

A brake device for braking an elevator installation traveling body movable along a guide rail includes a holder mounting a brake element having a brake surface movable relative to the holder between a freewheel position and a braking position. In a deactivated configuration, a pretensioning element does not exert any force moving the brake element towards the braking position, and in an activated configuration exerts such force. In a retaining state, a release element retains the pretensioning element in the deactivated configuration, and when activated into a released state, the release element changes the pretensioning element into the activated configuration. In an unactuated state, a friction-generating element does not abut the guide rail and, in an actuated state generates friction by abutting the guide rail to exert a force on the brake element and force the brake element towards the freewheel position.

15 Claims, 4 Drawing Sheets

(56) References Cited

FOREIGN PATENT DOCUMENTS

| | | | |
|---|---|---|---|
| WO | 2015047391 | A1 | 4/2015 |
| WO | 2017087978 | A1 | 5/2017 |

BRAKE DEVICE, E.G. WITH AN ECCENTRIC ELEMENT, FOR BRAKING A TRAVELING BODY THAT CAN BE MOVED IN A GUIDED MANNER ALONG A GUIDE RAIL IN A MOVEMENT DIRECTION

FIELD

The present invention relates to a brake device for braking a traveling body that can be moved in a guided manner along a guide rail in a movement direction. Furthermore, the invention relates to an elevator installation comprising such a brake device and to a method for releasing a previously activated brake device in such an elevator installation.

BACKGROUND

In elevator installations, elevator cars are moved between different floors with the aid of a drive machine. In particular in elevator installations for tall buildings, the drive machine usually drives cable-like suspension means that retain and move the elevator car and a counterweight. The elevator car and the counterweight are guided laterally by one or more guide rails during their vertical movement in a movement direction.

The elevator car and counterweight each represent a traveling body that can be moved along a generally vertical travel path. Such a traveling body is described below using the example of the elevator car. However, the brake device described herein can also be used to brake the counterweight.

In order to be able to safely brake a movement of the elevator car, a brake device is generally provided on the elevator car. This brake device can be designed in particular as a safety brake and configured to be able to brake the elevator car very efficiently and quickly, for example to protect it from falling. The brake device typically comprises brake elements which, when the brake device is activated, are pressed against one or more surfaces of a guide rail in order to bring about a necessary braking force for braking the elevator car by means of a friction caused thereby. If designed as a safety brake, the brake device is usually designed to be self-reinforcing, i.e. a contact pressure with which the brake element is pressed against the guide rail is reinforced due to the relative movement between the guide rail and the brake device itself.

Conventional brake devices for elevator installations, in particular safety brakes, are described, for example, in WO 2015/047391 A1, WO 2005/044709 A1, WO 2011/078848 A1, and WO 2017/087978 A1.

SUMMARY

It has been observed that it can be expensive, particularly in the case of self-reinforcing brake devices, to bring a brake device that has been activated back into its original, deactivated state.

There may therefore be a need, among other things, for a brake device which can be returned to its initial state in a simple manner after a braking process. Furthermore, there may be a need for an elevator installation equipped with such a brake device and for a method for releasing a previously activated brake device in such an elevator installation.

A need of this kind can be met by the subject matter according to any of the advantageous embodiments that are defined in the following description.

According to a first aspect of the invention, a brake device for braking an elevator car that can be moved along a guide rail in a movement direction is proposed. The brake device comprises a holder, a brake element, a pretensioning element, a release element, and a pressure-generating element. The brake element is mounted and retained on the holder in such a way that the brake surface of the brake element can be moved relative to the holder between a freewheel position and a braking position, wherein the brake surface of the brake element can be laterally spaced apart from the guide rail in the freewheel position and can be laterally pressed against the guide rail in the braking position. In a deactivated configuration, the pretensioning element does not exert any of the force moving the brake element towards the braking position on the brake element, and in an activated configuration, the pretensioning element exerts a force moving the brake element towards the braking position on the brake element. In a retaining state, the release element is configured to retain the pretensioning element in the first configuration, and when activating the release element into a released state, the release element changes the pretensioning element from the first configuration into the second configuration. In an unactuated state, the friction-generating element does generate any friction by abutting the guide rail and the friction-generating element therefore does not exert any force resulting from such friction on the brake element. In an actuated state, the friction-generating element generates friction by abutting the guide rail in a such a way that the friction-generating element exerts a force resulting from this friction on the brake element, which forces the brake element in a direction towards the freewheel position.

According to a second aspect, an elevator installation which has a guide rail, an elevator car that can be moved in a guided manner along the guide rail in a movement direction, a drive device for moving the elevator car, and a brake device according to an embodiment of the first aspect of the invention that is attached by means of its holder to the elevator car and arranged adjacent to the guide rail, is described.

According to a third aspect of the invention, a method for releasing a previously activated brake device in an elevator installation according to an embodiment of the second aspect of the invention is described. When the brake device is activated, the brake element is engaged into a fully engaged position by moving the brake element relative to the holder counter to a movement direction of the elevator car to be braked, in which position the brake surface abuts the guide rail and the brake element is clamped between the guide rail and the holder. In the method, the friction-generating element of the brake device is first actuated and then the brake device is moved by moving the elevator car by means of the drive device in a release direction opposite to the movement direction to be braked.

Possible features and advantages of embodiments of the invention can be considered, inter alia and without limiting the invention, to be based upon the concepts and findings described below.

In summary, the brake device described herein has at least one holder, one brake element, one pretensioning element, and one release element. The components mentioned can be configured similarly to conventional brake devices. The brake device described here differs from conventional brake devices in particular by virtue of the additional provision of a friction-generating element. The friction-generating element can be used to temporarily generate friction with the guide rail in a selectable manner, in order to be able to bring about a force on the brake element in this way, by means of which the brake element can be held stationary on the guide rail, for example during a release process in which the previously activated brake device is to be released again and brought into its initial state.

The individual components of the brake device and their functions are described in detail below.

The holder serves as a bearing to hold the brake element and to be able to move or pivot it relative to the holder. In this case, the holder can be designed to guide the brake element in a desired direction or along a desired path when the element moves relative to the holder. For example, the holder can mount and guide the brake element in such a way that it can move back and forth between the freewheel position and the braking position. The brake element can be pivoted about an axis, for example, so that its brake surface is spaced apart from the guide rail as long as the brake element is in its freewheel position, and the brake surface comes into contact with the guide rail when the brake element is pivoted into its braking position. The holder is also the component of the brake device which is coupled directly or indirectly to the elevator car to be braked and which remains stationary relative to the elevator car. Mechanically, the holder can be designed in such a way that it can withstand the forces brought about by the brake element during a braking process.

The brake element has a brake surface directed towards the guide rail, which surface is designed such that when the brake surface comes into contact with a surface of the guide rail, strong frictional forces are generated which counteract further movement of the brake element relative to the guide rail. These forces can lead to the brake element being able to be moved relative to the holder of the brake device in the course of a braking process, and a braking effect being able to increase in a self-reinforcing manner. On the other hand, these forces can be transmitted to a large extent to the holder and then to the elevator car in order to efficiently brake its movement relative to the guide rail. As long as the brake device is unactuated, the brake element remains in its freewheel position in which the brake surface thereof is laterally spaced apart from the guide rail, i.e. in a direction transverse to the opposite surface of the guide rail. A gap between the brake surface and the surface of the guide rail can be several millimeters in the freewheel position, for example. As soon as the brake device is actuated, the brake element is moved from the freewheel position to the braking position, the brake surface of the element being brought towards the guide rail and pressed against the guide rail. While being moved, the brake element can be guided by the holder. A movement path can be curved, for example. In particular, the brake element can be pivoted about an axis between its freewheel position and its braking position, so that the movement path runs in the shape of a circular arc or spiral arc and the brake surface gradually approaches the surface of the guide rail against which the brake surface of the brake element is intended to be pressed.

The pretensioning element is provided for the purpose of moving the brake element from the freewheel position to the braking position when the brake device is actuated. However, as long as the brake device is not actuated, the pretensioning element should not move the brake element. To implement this function, the pretensioning element is configured to be changeable between a deactivated configuration and an activated configuration. In the deactivated configuration, the pretensioning element does not exert any force on the brake element which would move it towards the braking position. In the activated configuration, on the other hand, the pretensioning element exerts a force on the brake element which moves it from the freewheel position towards the braking position.

In order to maintain the pretensioning element in the deactivated configuration while the brake device is unactuated, the brake device also has a release element. The release element can also be brought into different states. In a retaining state, the release element holds the pretensioning element in its deactivated configuration in such a way that the brake element is ultimately not moved by the pretensioning element into its braking position. However, if the release element has been activated in response to actuation of the brake device, the release element transitions to a released state. The release of the release element is thus accompanied by a change of the pretensioning element from its initially deactivated configuration to the activated configuration, so that the pretensioning element moves the brake element into its braking position.

While the functionalities explained above and the structural configurations of the brake device used for this purpose are similar to conventional brake devices, the brake device described here also comprises the friction-generating element. The friction-generating element can also be switched back and forth between at least two different states. In an unactuated state, the friction-generating element does not abut the guide rail, so that accordingly no friction is created between the friction-generating element and the guide rail. Accordingly, no force resulting from such friction is generated, which could be transmitted from the friction-generating element to the brake element. However, as soon as the pressure element is switched to its actuated state, at least one surface of the friction-generating element contacts an opposite surface of the guide rail. A force is brought about on the friction-generating element due to the friction caused thereby. This force is directed against a direction of movement with which the elevator car and the brake device attached thereto move relative to the guide rail. The friction-generating element is mechanically coupled to the brake element, so that the force is transmitted to the brake element. The friction-generating element can thus be used in a controllable manner to brake the brake element, preferably independently of any influences from other components of the brake device, during a relative movement of the brake device relative to the guide rail and preferably to keep the brake element stationary on the guide rail.

As will be explained in more detail below, the pressure element can thus advantageously be used, in particular during a release process in which the previously activated brake device is to be released again, to hold the brake element stationary on the guide rail at least temporarily, by being held stationary on the guide rail by the friction-generating element when it is temporarily actuated. Such a temporary fixing of the brake element on the guide rail can advantageously be used to return the previously activated brake device to its original, unactuated state in a simple manner and preferably without additional tools and/or interventions, for example by a technician.

According to one embodiment, the brake element is an eccentric element which moves from a freewheel orientation, in which a sub-region of a lateral surface of the eccentric element acting as a brake surface is in the freewheel position, can be pivoted eccentrically about a pivot axis into a braking orientation in which the sub-region of the lateral surface of the eccentric element acting as a brake surface is in the braking position.

In other words, the brake element can be designed as an eccentrically-mounted component. In such an eccentric element, a pivot axis generally does not run through a geometric center of the eccentric element, but is offset therefrom. Different sub-regions of the outer surface of the eccentric element are therefore at different distances from the pivot axis. Accordingly, depending on the current orientation of the eccentric element, the different sub-regions are spaced apart at different distances, for example from an opposite surface of the guide rail.

When the eccentric element is in its freewheel orientation, a sub-region of its outer surface that is closest to the guide rail is spaced apart from the surface of the guide rail by a gap. When, on the other hand, the eccentric element is in its braking orientation, a sub-region of its outer surface that is then closest to the guide rail is no longer at a distance from the surface of the guide rail, but abuts it. Accordingly, in its braking orientation, the eccentric element can generate friction with the guide rail and, as a result, a braking force for braking the elevator car with the sub-region acting as a braking surface. The eccentric element can have a circular cross section, i.e. the lateral surface can be cylindrical. The eccentric element can be pivoted by an operating angle between the freewheel orientation and the braking orientation. The operating angle can be, for example, between 5° and 175°, typically between 10° and 90°, preferably between 10° and 50°.

The brake element is described below in general with reference to its configuration as an eccentric element. However, it should be noted that the brake element can also be configured with a different geometry and/or a different type of mounting.

According to one embodiment, the pretensioning element is designed as an elastically deformable element, in particular as a spring element. It is arranged and interacts with the holder and the brake element in such a way that, in its activated configuration, the pretensioning element pivots the brake surface of the brake element into mechanical contact with the guide rail.

In other words, the pretensioning element can be elastically deformed so that it can be brought into an elastically pretensioned state. For example, the pretensioning element can be designed as a spring element, for example as a helical spring or the like. The pretensioning element can, for example, be coupled to the holder of the brake device at one end and can interact with the brake element at an opposite end. In this case, the pretensioning element should be arranged and configured such that, when it transitions from its deactivated configuration to its activated configuration, it pivots the brake surface of the brake element towards the guide rail until the brake surface thereof comes into mechanical contact with the guide rail.

For example, the pretensioning element can be mechanically pretensioned in its deactivated state and the strength and direction of the mechanical pretension can be such that the pretensioning element, when it is brought into the activated state, uses this pretension to pivot the brake element from its freewheel orientation to its braking orientation and in so doing presses its brake surface against the guide rail at least slightly. Such a pretensioning element can ensure that the brake device can be activated reliably. In this case, the pretensioning element can be implemented as a passive element, i.e. it can manage without its own power supply.

According to a specific embodiment, one end of the elastically deformable element can interact eccentrically with the eccentric element and can be mechanically pretensioned in its deactivated configuration.

In other words, the deformable element can be coupled to the eccentric element at a distance from the center, i.e. for example a geometric center, of the eccentric element. The deformable element should also preferably interact with the eccentric element spaced apart from the pivot axis of the eccentric element. In its deactivated configuration, the deformable element should thereby be elastically pretensioned, i.e. compressed or stretched. Accordingly, when the deformable element transitions to its activated configuration, it can exert a force on the eccentric element spaced apart from its center and/or its pivot axis and thereby cause a torque pivoting the eccentric element. Because of this torque, the eccentric element can then be pivoted from the freewheel orientation to the braking orientation.

According to a further embodiment, the pretensioning element can be designed as an elastically deformable element, in particular as a spring element, and can be arranged and interact with the holder and the brake element in such a way that, in the deactivated configuration, it is pretensioned in a first direction. In addition, the pretensioning element can be arranged and interact with the holder and the brake element in such a way that, in a fully engaged configuration of the brake element, it is pretensioned in a second direction directed transversely to the first direction. In the fully engaged configuration, the brake element can be moved, by means of friction on the guide rail, counter to the movement direction beyond a position in which the brake surface of the brake element, coming from the freewheel position, first abuts the guide rail.

In other words, the pretensioning element can be configured and arranged so as to be mechanically pretensioned in a first direction in its deactivated configuration. In its activated configuration, the pretensioning element can then first transition into an untensioned state and in the process move the brake element from its freewheel orientation into its braking orientation, i.e. by means of the brake surface thereof towards the guide rail. If the brake element abuts the guide rail by means of its brake surface, it is typically moved further, i.e. pivoted further about the pivot axis, by the guide rail due to the relative movement still taking place between the guide rail and the brake device. The brake element is moved towards a fully engaged configuration in which a sub-region of the brake element is increasingly clamped between the holder and the guide rail so that the overall braking force brought about reinforces itself.

When moving towards the engaged configuration, the pretensioning element is again deformed from a temporarily untensioned state to a mechanically pretensioned state. However, this pretensioned state does not correspond to the original pretensioned state in the deactivated configuration of the pretensioning element. Instead, in this case the pretensioning element is pretensioned in a different, second direction compared with the original pretensioned state. This second direction may be transverse or opposite to the first direction in which the pretensioning element was pretensioned in its deactivated configuration.

The pretensioning element can thus be pretensioned in both its deactivated configuration and in its fully engaged configuration, for example subjected to a tensile pretension in both configurations or subjected to a compressive pretension in both configurations. However, the pretension direction can be different in both configurations. For example, the first direction and the second direction can differ from one another by an angle of between 5° and 175°, preferably between 10° and 90° or between 20° and 50°. Alternatively, the pretensioning element may be subjected to a tensile pretension in its deactivated configuration and subjected to a compressive pretension in its fully engaged configuration. The directions of this pretension can also be different in this case. In extreme cases, the two pretensions can be directed in opposite directions.

If the brake element is designed to be pivotable, the pretensioning element can thus initially pivot the brake element, coming from its freewheel orientation into the braking orientation, due to its pretension. When the brake element then abuts the guide rail and is then carried along further thereby, it moves into the fully engaged position or orientation and in doing so pretensions the pretensioning element in a different direction. Thus, when the brake element eventually reaches its fully engaged configuration, the spring is strongly stretched and therefore exerts a restoring force on the brake element which, if not clamped in the engaged configuration, would move the brake element away from the fully engaged configuration and towards an orientation at which the brake element, coming from the freewheel position, first abutted the guide rail.

Such a configuration and arrangement of the pretensioning element, as discussed below, may be advantageous for releasing the brake device to assist the brake element in moving out of the fully engaged configuration and in a direction back towards the original freewheel position.

According to one embodiment, the release element can be designed as a latch that can be moved between a latched position and an unlatched position. The latch, in its latched position, can retain the pretensioning element in its deactivated configuration and, in its unlatched position, can release the pretensioning element into its activated configuration.

In other words, a latch which can be moved between a latched and an unlatched position can be provided as the release element. In the latched position, the latch can block the pretensioning element such that the element remains in its deactivated configuration. The latch itself can, for example, be held in its latched position with the aid of an actuator, for example an electromagnet that can be energized in a controllable manner. When the latch is released, i.e. moved into its unlatched position, it releases the pretensioning element so that the element transitions into its activated configuration and can then move the brake element from its original freewheel position into its braking position.

Possible configurations of the friction-generating element, by means of which the brake element can be controlled and preferably held as stationary as possible on the guide rail independently of other components of the brake device, are described below.

According to one embodiment, the friction-generating element comprises a pressure element and an actuator. The actuator is configured to retain the pressure element spaced apart from the guide rail in the unactuated state of the friction-generating element. In the actuated state of the friction-generating element, the pressure element can be pressed against the guide rail by the actuator.

In other words, the friction-generating element can be composed of a plurality of sub-components. One of the sub-components is the pressure element. The pressure element should be movable within the friction-generating element, i.e. relative to other sub-components of the friction-generating element, between the unactuated state and the actuated state. The pressure element has a pressure surface which lies opposite a surface of the guide rail. In the unactuated state, the pressure surface of the pressure element is spaced apart from the guide rail by a gap. Accordingly, no friction is generated between the pressure element and the guide rail. In the actuated state, however, the actuator moves the pressure surface of the pressure element into mechanical contact with the guide rail. Accordingly, there is friction between the pressure element and the guide rail.

In order to be able to press the pressure element with the actuator firmly against the guide rail, the friction-generating element may also comprise further components, such as a counter-bearing element. This counter-bearing element can, for example, reach behind the guide rail from an opposite side, so that the friction-generating element can be supported with its counter-bearing element on a remote side of the guide rail, in order to then be able to press the pressure element against a surface on the facing side of the guide rail.

In order to be able to generate high frictional forces, the pressure element may comprise a type of brake pad, for example made of an elastomer material, on its pressure surface.

In general, the friction-generating element can be implemented with different types of actuators. For example, the pressure element can be moved between the unactuated state and the actuated state with the aid of hydraulics, pneumatics, a mechanical actuator to be actuated, for example, by an electric motor, or the like.

According to one embodiment, the friction-generating element is advantageously designed with an electromagnet. When an electric current is applied to an electromagnet, it can form a magnetic field. Due to this magnetic field, the electromagnet can experience an attractive force towards a magnetizable component, such as the guide rail in the present case. In this case, there is no need for a counter-bearing element. When the friction-generating element designed with the electromagnet as an actuator is activated, its pressure element can thus be pulled towards the guide rail. Due to the friction generated with the guide rail, the pressure element then brings about a force which can be transmitted to the brake element by coupling it to the brake element in order to brake it or to keep it stationary.

According to one embodiment, the friction-generating element comprises a mechanism that is configured to move the pressure element towards the counter-bearing element, wherein the guide rail can be arranged between the pressure element and the counter-bearing element.

As an alternative or in addition to the configuration of the friction-generating element described above, such an embodiment can comprise an electromagnet. The mechanism can be actuated to activate the friction-generating element. For this purpose, the mechanism can have a controllable actuator. Such an actuator can have an electric motor, for example. When the mechanism is actuated, it can move the pressure element towards the counter-bearing element. Since the counter-bearing element is arranged on the opposite side of the guide rail and can be supported, for example, on an opposite surface of the guide rail, the pressure element can be pulled towards the guide rail as a result. Since the friction-generating element is mechanically coupled to the brake element, the brake element can be braked relative to the guide rail or can be held stationary on the guide rail in this way.

According to one embodiment, the friction-generating element is pivotally connected to the brake element.

In other words, the friction-generating element is mechanically coupled to the brake element in order to be able to transmit braking or retaining forces brought about by the friction-generating element to the brake element. However, the coupling should preferably not be rigid, i.e. it should be designed in such a way that every movement of the friction-generating element necessarily causes a movement of the brake element that is directed in the same direction and is equal in magnitude. Alternatively, the friction-generating element can be pivotally coupled to the brake element such that a force generated by the friction-generating element is transmitted to the brake element, but can cause a movement on the brake element that can differ from the movement of the friction-generating element.

For example, a force brought about by the friction-generating element can lead to a brake element designed as an eccentric element pivoting about its pivot axis on the holder. In particular, a force brought about by the friction-generating element and directed away from the brake element can be transmitted via the pivotable coupling to the brake element in such a way that the brake element is moved away from a previously assumed fully engaged configuration, i.e. towards the braking configuration or ultimately the freewheel configuration.

Embodiments of the brake device described herein can be used in an elevator installation according to the second aspect of the invention. The holder of the brake device is attached to the elevator car, i.e. fastened directly or indirectly thereto. The brake device is arranged in such a way that it is adjacent to the guide rail guiding the elevator car and its brake element or brake elements can be moved into their braking position when the brake device is actuated and can interact with the guide rail in a braking manner.

According to the third aspect of the invention, a method is described by means of which embodiments of the brake device described herein can be released again after they have been previously activated or actuated.

A release of the brake device can be understood here in particular to mean that the brake device can stop an interaction of its brake element with the guide rail, and thus the effect of braking forces, independently, i.e. without a technician having to be either on site or involved and having to release the brake device manually, for example.

Preferably, the release of the brake device can even be understood to mean that the brake device, after it has been previously activated or actuated, i.e. following a braking process, can be brought back into an initial configuration in which the elevator installation can be operated normally and the brake device can be actuated again as needed. The release of the brake device can be partially automated or even fully automated.

In other words, the method proposed herein according to the third aspect of the invention can allow the elevator car to be braked using the brake device and then, preferably without the intervention of a technician on site, to bring the elevator installation back into normal operation by releasing the brake device and returning it to its original state, from which it can be reactivated. After the brake element has been pressed with the brake surface thereof in contact with the guide rail due to the previous activation of the brake device and has then been moved into the fully engaged position, it can be released again from the fully engaged position. Furthermore, the brake element can even be moved back into its freewheel position and the pretensioning element can then be shifted back into its deactivated configuration and the release element can be shifted into the state thereof in which it retains the pretensioning element in the deactivated configuration.

In order to be able to achieve this, the friction-generating element is first actuated when the brake device has previously been activated. In this actuated state, the friction-generating element then brings about a friction-related force, which is transmitted to the brake element and as a result of which the brake element is held stationary on the guide rail. In this way, the brake element is fixed to the guide rail. The elevator car is then moved by means of the drive device in a release direction which is opposite to the movement direction that was to be braked originally. That is to say, if the elevator car has moved downwards when the brake device is activated, it is moved upwards by the drive device in order to release the brake device. Such a movement of the elevator car in the release direction also moves the holder of the brake device in the release direction. However, since the brake element is fixedly held on the guide rail due to the previously actuated friction-generating element, the brake element does not move together with the holder, but is moved relative thereto from its previously assumed fully engaged position. A braking effect brought about by the brake element can thus be released.

According to one embodiment, the elevator car can be moved in the release direction until the brake element which is held stationary on the guide rail by the actuated friction-generating element is moved relative to the holder into a fixing position in which the pretensioning element is in a position corresponding to its deactivated configuration, and the release element transitions from its released state to its retaining state to retain the pretensioning element in its deactivated configuration.

In other words, in the method described here, the actuated friction-generating element can hold the brake element on the guide rail in a stationary manner until it is moved so far relative to the holder of the brake device that the pretensioning element is fully pretensioned again, i.e. located in its original deactivated configuration. The thus-retensioned pretensioning element can then be secured in its deactivated configuration again by returning the release element to its retaining state from a previously released state. In summary, the brake device is then back in its original state and can then be operated again, i.e. actuated again, during normal operation of the elevator installation.

Specifically in relation to the embodiment described above, this can mean that the brake element designed as an eccentric element, which was rotated into its fully engaged position due to the previous activation and thereby clamped with a sub-region between the holder and the guide rail, is first moved back from the fully engaged position by the elevator car, together with the holder, being moved in the release direction counter to the movement direction that was originally to be braked.

The brake element can optionally be assisted in this movement by the spring acting as a pretensioning element, provided that the spring was driven from a temporarily untensioned state to another state that is transverse to the first pretensioned state or an oppositely pretensioned state during the previous engagement of the brake element into its fully engaged position. The resulting pretension can assist in pushing the brake element out of the fully engaged position when the brake device is released.

Without the support of the friction-generating element, however, the brake element would only be released from the fully engaged position, i.e. the eccentric element forming the brake element would only be rotated and reoriented until its brake surface was no longer pressed against the guide rail. Moreover, the brake element could not be moved back to its original position, in particular because the pretensioning element would already be pushing or pulling in the opposite direction.

However, with the aid of the friction-generating element, the brake element can also be held stationary on the guide rail without a pressing interaction with the holder. If the elevator car, together with the holder, is thus moved further in the release direction, the brake element pivots gradually towards its original orientation, i.e. close to its freewheel orientation, with the brake element fixed to the guide rail by means of the friction-generating element gradually pretensioning the spring that forms the pretensioning element. The pretensioning element is ultimately brought into its deactivated configuration. The latch forming the release element can then be moved from its previously released state back into its retaining state and, for example, the electromagnet provided thereon can be activated in order to lock the latch in the retaining state. In summary, the brake device is then back in its initial configuration and is thus ready to be actuated for a subsequent braking process.

The entire process for releasing the brake device can be carried out automatically. It is not necessary, as is usually the case with conventional brake devices, for a technician to reset the brake device to its original configuration on site. Instead, this can be brought about solely by appropriately moving the elevator car in the release direction and temporarily actuating the pressure element of the brake device.

It should be noted that some of the possible features and advantages of the invention are described herein with reference to different embodiments of the brake device or the elevator installation equipped therewith, or to the method for releasing the previously activated brake device to be carried out therewith. A person skilled in the art will recognize that the features can be suitably combined, adapted, or exchanged in order to arrive at further embodiments of the invention.

It should also be noted that the applicant of the present patent application filed another patent application with the title "Brake device, e.g. with a wedge-shaped brake element, for braking a traveling body that can be moved in a guided manner along a guide rail in a movement direction" having International Publication Number WO 2021/115846 A1. This further patent application describes embodiments that can also be implemented for the present patent application. In particular, embodiments are described therein in which the brake element is designed not as an eccentric element, but in the shape of a wedge. The further patent application is included herein in its entirety by reference.

Embodiments of the invention will be described below with reference to the attached drawings; neither the drawings nor the description should be interpreted as limiting to the invention.

The drawings are merely schematic and not true to scale. In the various figures, identical reference signs refer to features which are identical or have an identical function.

DETAILED DESCRIPTION

Figure 1:
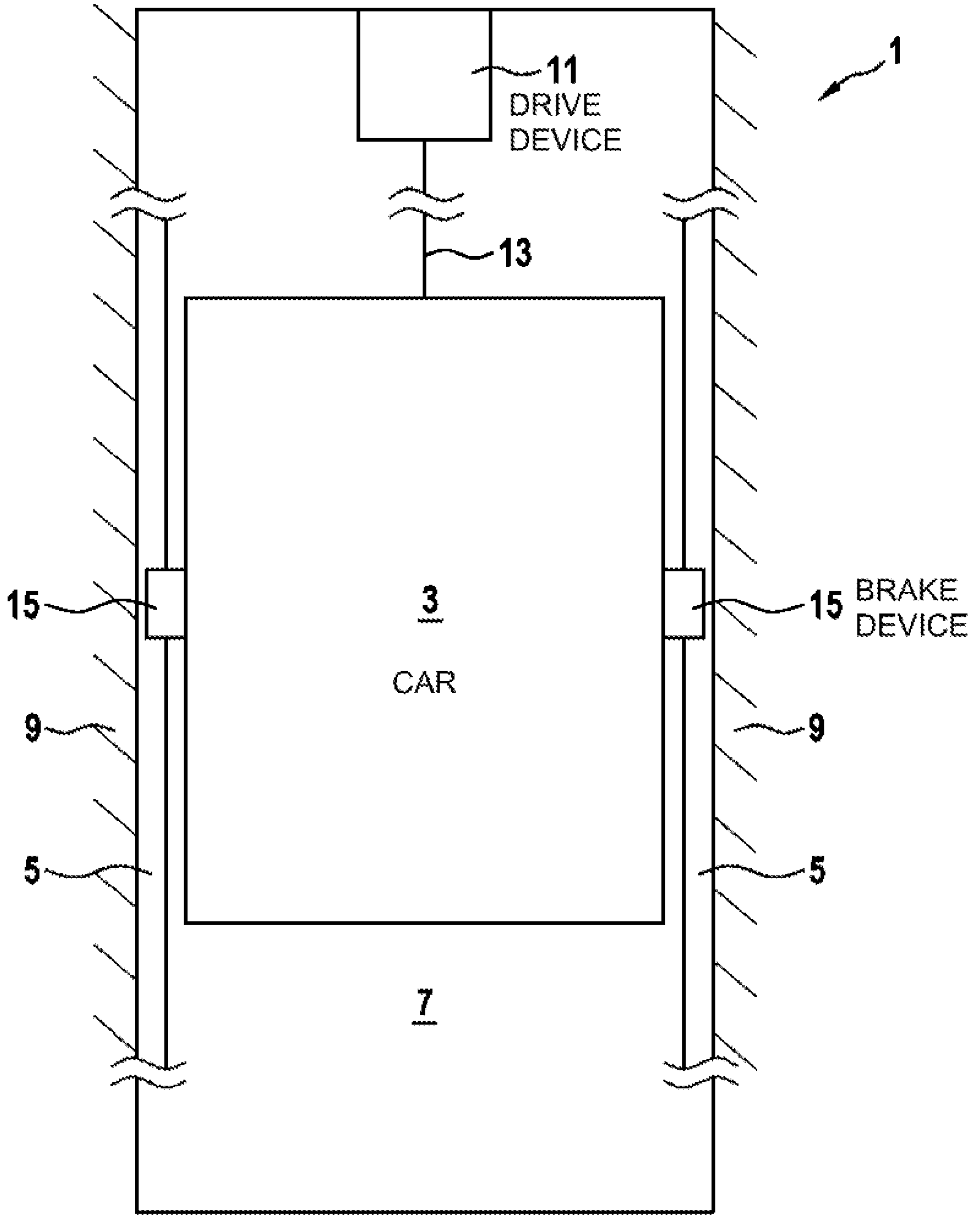
FIG. 1 shows an elevator installation according to an embodiment of the present invention.

FIG. 1 shows an elevator installation 1 according to an embodiment of the present invention. The figure only shows components which allow an understanding of the present invention. The elevator installation 1 can have further components, which are not shown for reasons of clarity.

The elevator installation 1 comprises a traveling body in the form of an elevator car 3 which can be moved vertically within an elevator shaft 7. During its vertical movement, the elevator car 3 is guided laterally by guide rails 5 which are attached to side walls 9 of the elevator shaft 7 and extend along an entire travel path of the elevator car 3. The elevator car 3 is held by cable-like suspension means 13 which can be moved by means of a drive device 11. Two brake devices 15 are attached to the elevator car 3. The brake devices 15 are each arranged adjacent to one of the guide rails 5 and can interact therewith to generate a braking force.

Figure 2A:
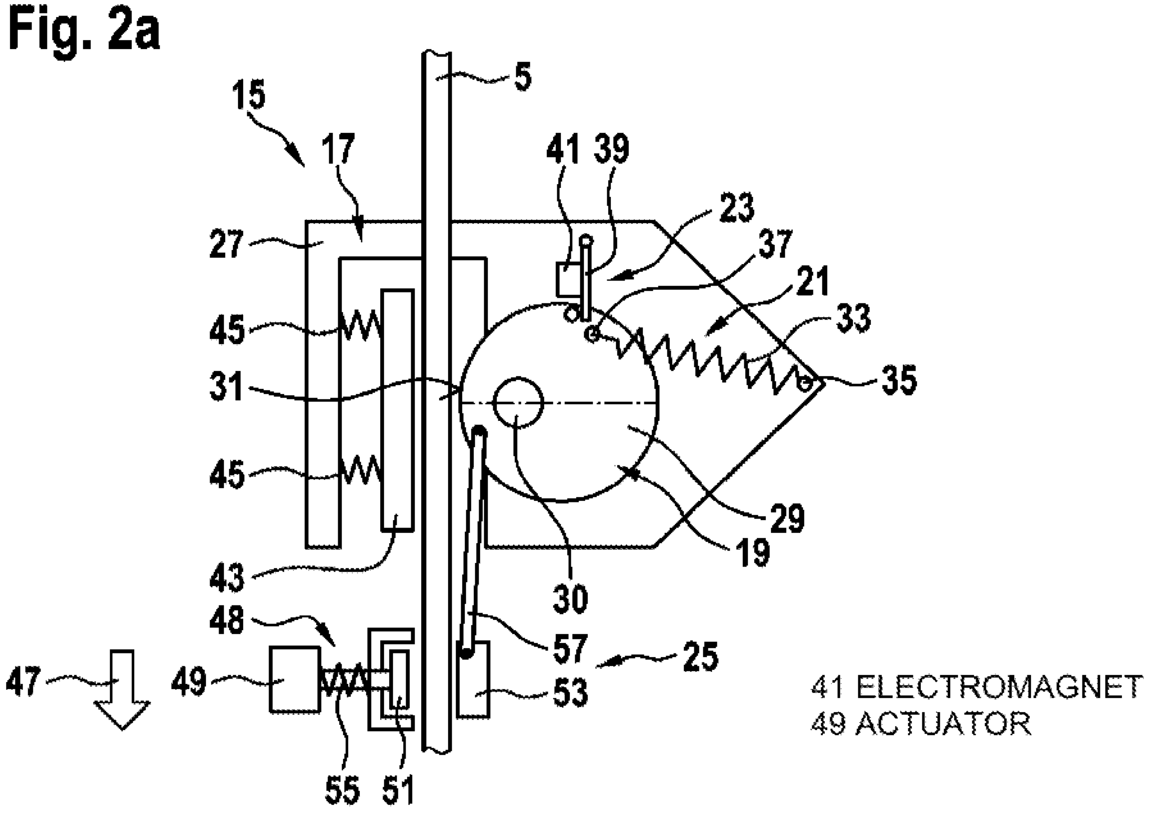
FIGS. 2*a-f* show a brake device according to an embodiment of the present invention in different stages during activation and then release of the brake device.

FIG. 2*a* shows a brake device 15 according to an embodiment of the invention in cross section. The brake device 15 comprises a holder 17, a brake element 19, a pretensioning element 21, a release element 23, and a friction-generating element 25.

The holder 17 is implemented using a frame 27 in the example shown. This frame 27 can be fastened to the elevator car 3. The frame 27 is designed to transmit the forces generated by the brake device 15 to the elevator car 3, in particular to brake the elevator car. The frame 27 also serves to support other components such as, inter alia, the brake element 19, the pretensioning element 21, and the release element 23.

On its lateral surface, the brake element 19 has a brake surface 31 directed towards the guide rail 5. Due to its material and/or its structure, the brake surface 31 can be adapted to bring about high frictional forces upon contact with the guide rail 5.

In the present case, the brake element 19 is designed as an eccentric element 29. In the example shown, the eccentric element 29 has a circular cross section and can be pivoted about an eccentrically arranged axis 30. The axis 30 is coupled to the frame 27 of the holder 17. Accordingly, the eccentric element 29 can be pivoted relative to the holder 17 in different orientations.

As long as the brake device 15 is not actuated, the eccentric element 29 forming the brake element 19 is pivoted into a freewheel orientation shown in FIG. 1, in which the brake surface 31 is laterally spaced apart from an opposite surface of the guide rail 5. Accordingly, no friction is created between the brake element 19 and the guide rail 5 in this unactuated state.

Figure 2B:
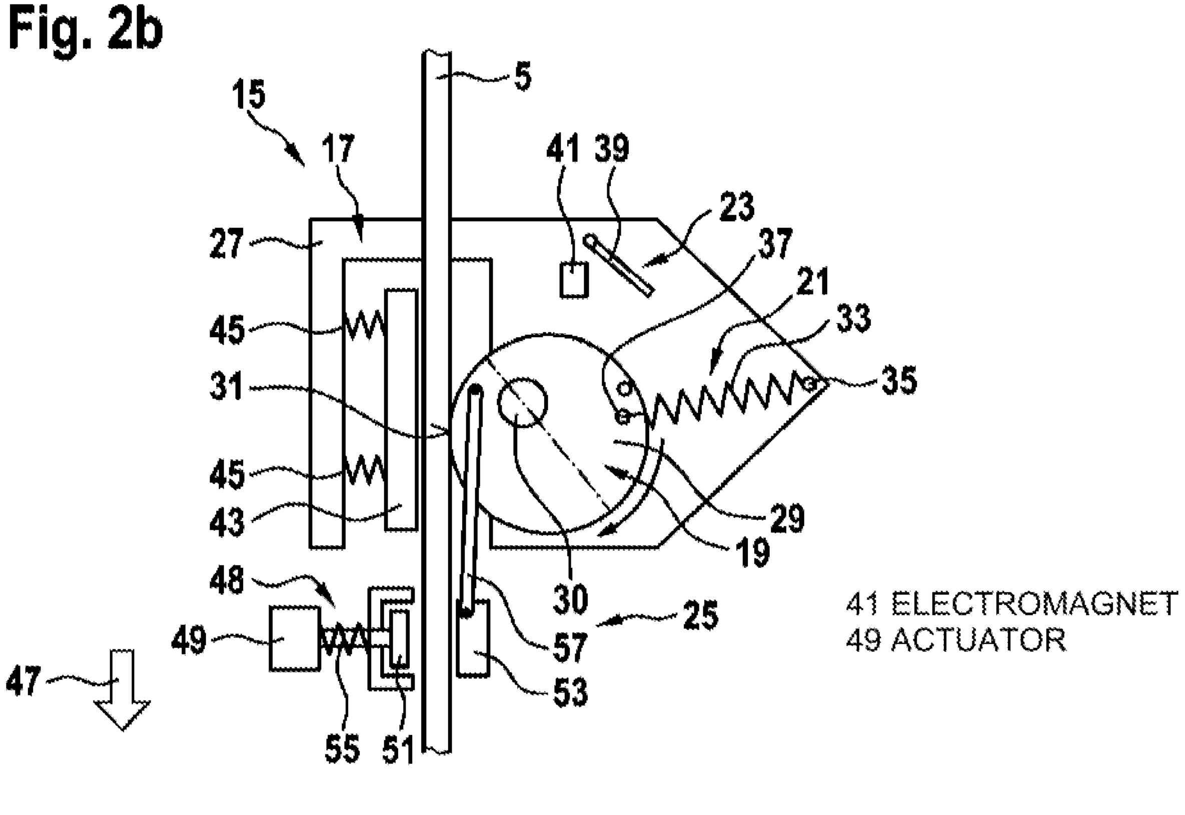

When the brake device 15 is actuated, the eccentric element 29 is pivoted from its freewheel orientation into a braking orientation. In this braking orientation, the brake surface 31 comes into contact with the opposite surface of the guide rail 5, as shown in FIG. 2*b*. This mechanical contact causes considerable friction between the brake element 19 and the guide rail 5 in the actuated state.

In order to be able to pivot the brake element 19 from its freewheel orientation in the direction of its braking orientation, the brake device 15 comprises the pretensioning element 21. The pretensioning element 21 is an elastically deformable element such as a spring 33. In the example shown, this spring 33 is arranged between a first fastening point 35 on the frame 27 of the holder 17 and a second fastening point 37 on the brake element 19. The second fastening point 37 is arranged eccentrically on the eccentric element 29, in particular away from the axis 30 and preferably close to an outer circumference of the eccentric element 29.

As long as the brake device 15 is not actuated, the pretensioning element 21 remains in a deactivated configuration, as illustrated in FIG. 2*a*. In this deactivated configuration, the pretensioning element 21 is mechanically pretensioned in a first direction. In the example shown, the spring 33 used for this purpose is mechanically stretched.

In order to retain the pretensioning element 21 in this deactivated configuration as long as the brake device 15 is not actuated, the brake device 15 comprises the release element 23. In the example shown, this release element 23 is designed with a latch 39. This latch 39 can be held in a retaining state by means of an electromagnet 41 by the release element 23 retaining the pretensioning element 21 in its first configuration.

If the brake device 15 is to be actuated, the release element 23 can be activated in a released state, for example by no longer energizing the electromagnet 41 in the embodiment shown and the latch 39 thus being released. The latch 39 can then be moved from its latched position shown in FIG. 2*a*, in which it blocks a movement of the spring 33 used as the pretensioning element 21, to an unlatched position shown in FIG. 2*b*, in which it releases the pretensioning element 21. In the example shown, the latch 39 can be pivoted for this purpose.

The pretensioning element 21 released in this way, due the mechanical pretension prevailing therein, can then pivot the eccentric element 29 from its freewheel orientation into its braking orientation as illustrated in FIG. 2*b*. Due to its eccentric mounting about the axis 30, the brake surface 31 comes into lateral contact with the guide rail 5.

In order to be able to suitably counteract the force brought about on the brake element 19 and thus on the holder 17, the brake device 15 has a counter-pressure element 43 which is also attached to the holder 17 and is supported by counter-pressure springs 45 relative to the frame 27 of the holder 17.

As soon as the brake surface 31 of the brake element 19 abuts the guide rail 5, the brake element 19, due to the relative movement between the brake device 15 and the guide rail 5 in the movement direction 47, is further pivoted counter to this movement direction 47. Due to the configuration of the brake element 19 as an eccentric element 29, the contact pressure exerted by the brake element 19 on the guide rail 5 via the brake surface 31 thereof increases. The overall braking effect achieved by the brake device 15 is therefore self-reinforcing.

Figure 2C:
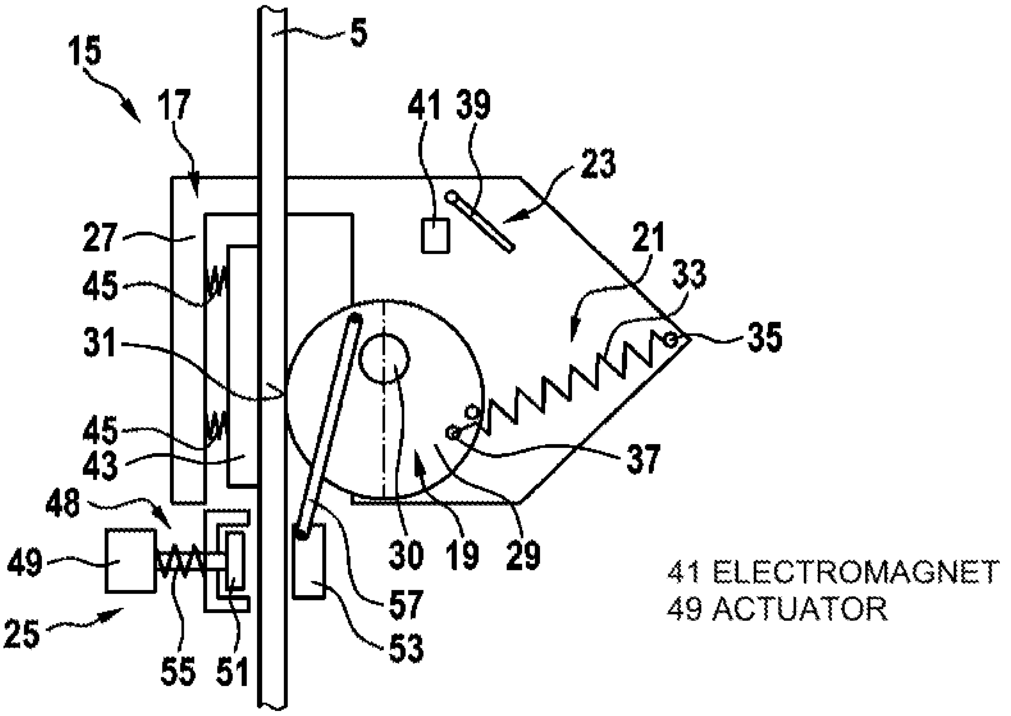

Ultimately, the brake element 19 is pivoted into a fully engaged configuration, as shown in FIG. 2*c*. In this configuration, the brake device 15 brings about high braking forces, with the aid of which the elevator car 3 fastened thereto can be braked to a standstill effectively and quickly.

During the pivoting movement of the brake element 19 from the position or orientation in which it reaches its braking position and first abuts the guide rail 5 with the brake surface 31 thereof to the position or orientation in which the brake element 19 has reached its fully engaged configuration, the brake element 19 is further pivoted relative to the frame 27 of the holder 17. As a result of this, the pretensioning element 21, which is fastened at one end to the second fastening point 37, is also stretched beyond its temporarily untensioned or at least less tensioned configuration into a further configuration subjected to a tensile pretension. However, in this case, the spring 33 forming the pretensioning element 21 runs in a different direction than was originally the case in the freewheel orientation. Accordingly, the force brought about by the pretensioned pretensioning element 21 on the brake element 19 in the freewheel orientation on the one hand and the fully engaged configuration on the other hand causes opposite torques on the brake element 19.

In other words, in the fully engaged configuration, the pretensioned pretensioning element 21 attempts to pivot the brake element 19 in a direction back to the braking orientation and ultimately to the freewheel orientation. However, in the fully engaged configuration, the forces clamping the eccentric brake element 19 to the guide rail 5 predominate, so that the brake element 19 remains in its fully engaged configuration despite the restoring forces exerted by the pretensioning element 21, as long as no further measures are taken.

In conventional brake devices, it was difficult to release an actuated brake device in which the brake element was moved into its fully engaged configuration, i.e. to return it to its original configuration.

Figure 2D:
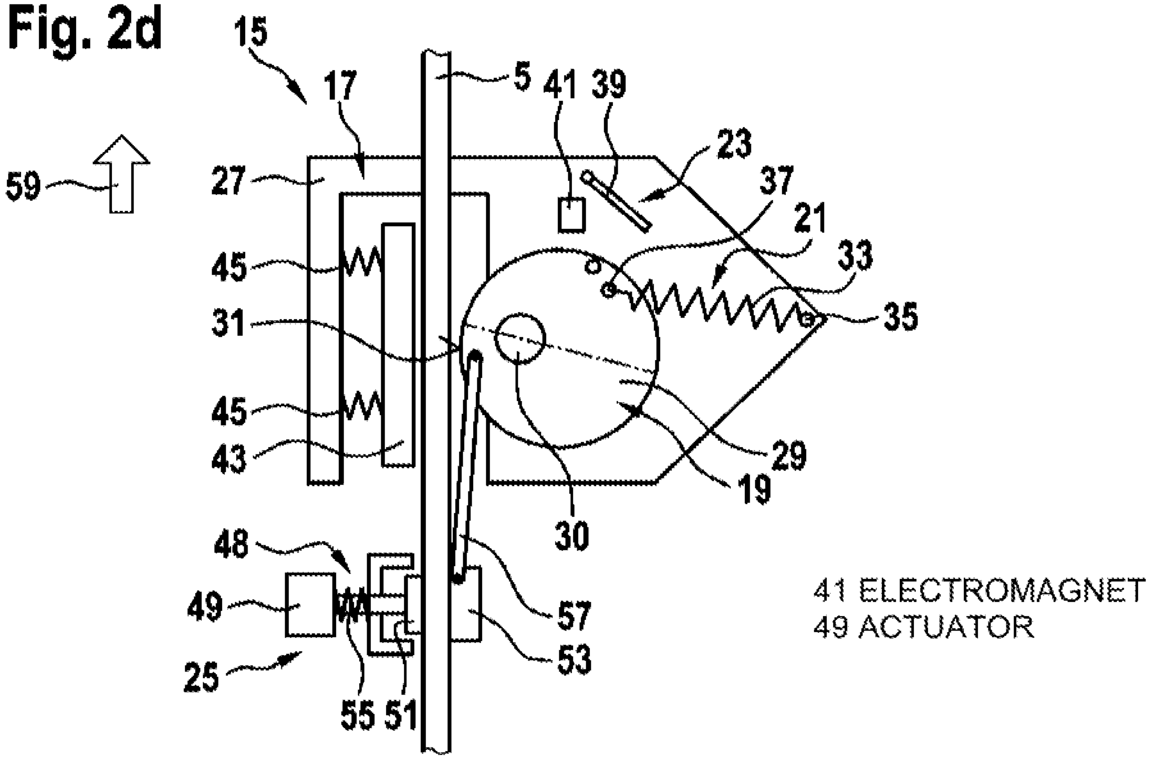
Figure 2E:
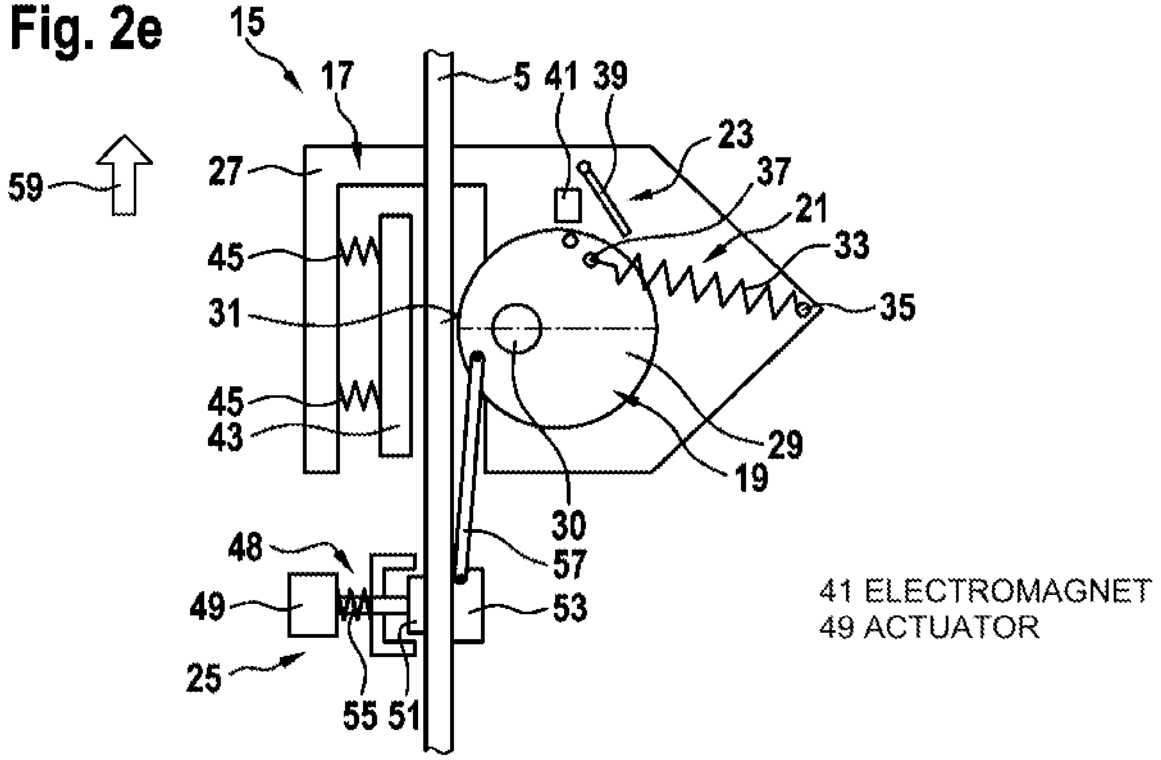
Figure 2F:
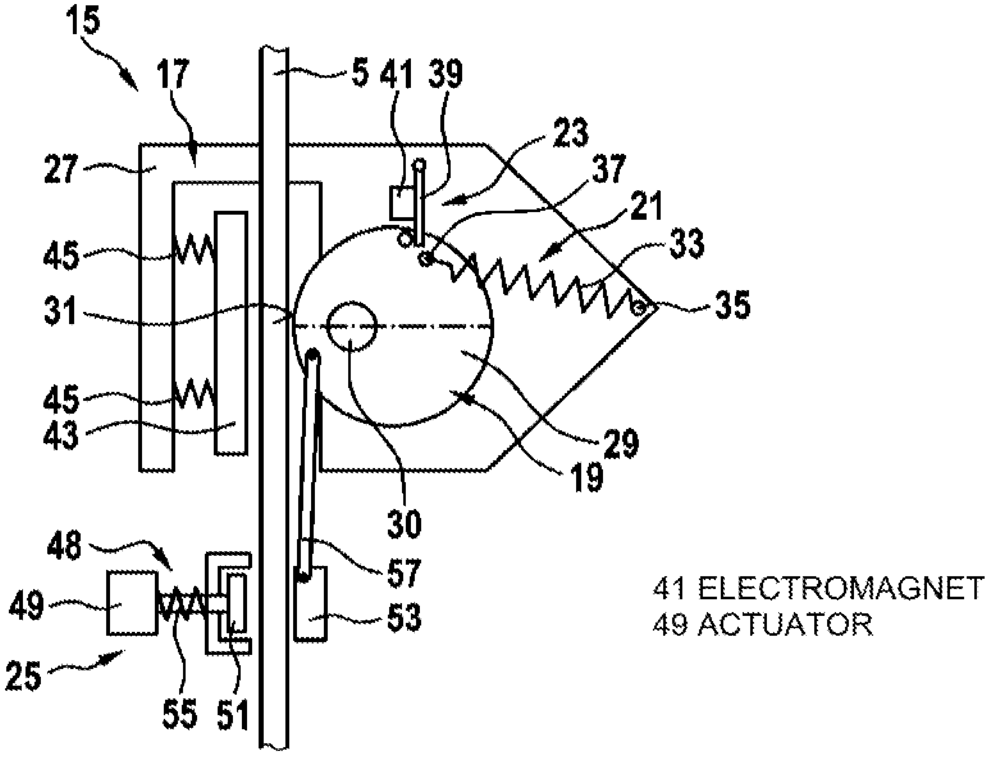

With reference to FIGS. 2*d* to 2*f*, it is described below how, with the brake device 15 presented here, such a release of the brake device 15 can be carried out easily and generally without the need for intervention by a technician, i.e. ideally in a fully automated manner.

To release the brake device 15, its friction-generating element 25 is first actuated. In the example shown, an actuator 49 of a mechanism 48 of the friction-generating element 25 is activated for this purpose. The actuator 49 then moves a pressure element 51, which was previously held at a distance from the guide rail 5 due to a pretension caused by a spacer spring 55, towards the guide rail 5. A counter-bearing element 53 can engage behind the guide rail 5 on an opposite side. By the pressure element 51 being pressed against the guide rail 5 and thereby being supported on the counter-bearing element 53, the friction-generating element 25 can generate considerable friction with the guide rail 5, which can bring about a braking force that opposes a movement direction 47 of the brake device 15 relative to the guide rail 5.

This braking force can, for example, be transmitted from the friction-generating element 25 to the brake element 19 with the aid of a coupling rod 57. A force transmission can take place in such a way that the force causes a torque on the eccentric element 29. For this purpose, for example, the coupling rod 57 can act eccentrically on the eccentric element 29, in particular at a distance from its axis 30. In this case, the coupling rod 57 can be pivotable relative to the eccentric element 29.

After the friction-generating element 25 has been actuated in this way, the elevator car 3 is moved, as illustrated in FIG. 2*d*, by means of the drive device 11 counter to the original movement direction 47 in a release direction 59, i.e. upwards in the example shown. As a result, the holder 17 is also moved together with the elevator car 3. Since the brake element 19 is pressed against the guide rail 5 and is thus held there in a stationary manner, the brake element 19 is thus moved out of its previously fully engaged configuration, i.e. pivoted back in the direction of the freewheel orientation.

Without the braking effect of the friction-generating element 25, however, the brake element 19 would soon lose the contact pressure of its brake surface 31 against the guide rail 5, since it would reach an orientation in which the brake surface 31 no longer abuts the guide rail 5. Accordingly, the brake element 19 would then begin to move along with the holder 17 without being pivoted any further. Thus, the brake element 19 could not be restored all the way back to its original configuration.

However, the braking effect of the actuated friction-generating element 25, or the effect of its being fixed to the guide rail 5, causes the brake element 19 to experience a torque even without it abutting the guide rail 5 itself. The force causing the torque is transmitted from the friction-generating element 25 to the brake element 19 via the coupling rod 57. Accordingly, the brake element 19 can be pivoted further relative to the holder 17, as illustrated in FIG. 2*e*, by the elevator car 3, together with the holder 17, being moved further in the release direction 59.

The pretensioning element 21 is thereby gradually tensioned until it eventually reaches its deactivated configuration again. In this situation, as shown in FIG. 2*f*, the release element 23 can be reconfigured back into its retaining state. For this purpose, the electromagnet 41 can be energized and the latch 39 can thereby be moved back into its latched position.

Ultimately, the braking effect that can be generated using the friction-generating element 25 can pivot the brake element 19 until it has reached its starting position relative to the holder 17, and the entire brake device 15 can thus be automatically returned to its original configuration.

It should be noted that the specific configuration of the components of the brake device 15 in FIGS. 2*a-f* is merely an example. As an alternative to the configuration shown, for example, the brake element 19 could also be implemented using a movable brake wedge instead of as an eccentric element 29. The pretensioning element 21 can also be implemented, for example, with other components that are suitable for bringing about suitably directed forces on the brake element 19 instead of with the spring 33. The release element 23, for example, instead of being implemented as a latch 39, can also be implemented in the form of other components that controllably block a movement of the brake element 19. The friction-generating element 25 may comprise components other than those shown in order to be able to generate friction with the guide rail 5 in a controllable manner. For example, the friction-generating element 25 can be designed with an electromagnet which, when energized, can pull a brake body against the guide rail 5.

Finally, it should be noted that terms such as "comprising," "having," etc. do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A brake device for braking a traveling body of an elevator installation, the traveling body being movable in a guided manner along a guide rail in a movement direction, the brake device comprising:

a holder adapted to be attached to the traveling body;

a brake element;

a pretensioning element;

a release element;

a friction-generating element;

wherein the brake element is mounted and retained on the holder and has a brake surface directed toward the guide rail when the holder is attached to the traveling body, the brake element being movable relative to the holder between a freewheel position and a braking position, wherein the brake surface is laterally spaced apart from the guide rail in the freewheel position and is pressed laterally against the guide rail in the braking position;

wherein the pretensioning element, in a deactivated configuration, does not exert a force on the brake element to move the brake element toward the braking position and, in an activated configuration, exerts a force on the brake element that moves the brake element toward the braking position;

wherein the release element, in a retaining state, retains the pretensioning element in the deactivated configuration and, when the release element is in a released state, changes the pretensioning element from the deactivated configuration into the activated configuration; and wherein the friction-generating element, in an unactuated state, cannot generate any friction by abutting the guide rail and therefore does not exert any force resulting from such friction on the brake element and, in an actuated state, the friction-generating element generates friction by abutting the guide rail to exert a force resulting from the generated friction on the brake element, which force forces the brake element in a direction towards the freewheel position.

2. The Brake device according to claim 1 wherein the brake element is an eccentric element having a sub-region of a lateral surface of the eccentric element that acts as the brake surface, the eccentric element being pivotable eccentrically about a pivot axis between a freewheel orientation and a braking orientation thereby pivoting the brake surface between the freewheel position and the braking position.

3. The brake device according to claim 2 wherein the pretensioning element is an elastically deformable element that interacts with the holder and the brake element such that, in the activated configuration, the pretensioning element pivots the brake surface into mechanical contact with the guide rail and wherein one end of the elastically deformable element interacts eccentrically with the eccentric element and is mechanically pretensioned in the deactivated configuration.

4. The brake device according to claim 1 wherein the pretensioning element is an elastically deformable element that interacts with the holder and the brake element such that, in the activated configuration, the pretensioning element pivots the brake surface into mechanical contact with the guide rail.

5. The brake device according to claim 4 wherein the pretensioning element is a spring.

6. The brake device according to claim 1 wherein the pretensioning element is an elastically deformable element, in particular as a spring (33), that interacts with the holder and the brake element such that, in the deactivated configuration, the pretensioning element is pretensioned in a first direction and in a fully engaged configuration of the brake element, the pretensioning element is pretensioned in a second direction transverse or opposite to the first direction, wherein, in the fully engaged configuration, the brake element is movable by friction on the guide rail, counter to the movement direction beyond a position in which the brake surface, moving from the freewheel position, first abuts the guide rail.

7. The brake device according to claim 6 wherein the pretensioning element is a spring.

8. The brake device according to claim 1 wherein the release element is a latch movable between a latched position and an unlatched position, and wherein the latch, in the latched position, retains the pretensioning element in the deactivated configuration and, in the unlatched position, releases the pretensioning element to the activated configuration.

9. The brake device according to claim 1 wherein the friction-generating element includes a pressure element and an actuator, wherein the actuator keeps the pressure element spaced apart from the guide rail in the unactuated state of the friction-generating element, and wherein the pressure element is pressed against the guide rail by the actuator in the actuated state of the friction-generating element.

10. The brake device according to claim 9 wherein the friction-generating element includes a mechanism for moving the pressure element toward a counter-bearing element, and wherein the guide rail is arranged between the pressure element and the counter-bearing element.

11. The brake device according to claim 1 wherein the friction-generating element includes an electromagnet.

12. The brake device according to claim 1 wherein the friction-generating element is pivotally connected to the brake element.

13. An elevator installation comprising:

a guide rail;

a traveling body movable in a guided manner along the guide rail in a movement direction;

a drive device for moving the traveling body; and the brake device according to claim 1 attached by the holder to the traveling body and being arranged adjacent to the guide rail.

14. A method for releasing the brake device in the elevator installation according to claim 13, the brake device having been previously activated such that the brake element is engaged in a fully engaged position by moving the brake element relative to the holder counter to a movement direction of the traveling body being braked, wherein the brake surface abuts the guide rail and the brake element is clamped between the guide rail and the holder, the method comprising the steps of:

actuating the friction-generating element of the brake device; and moving the brake device by moving the traveling body using the drive device in a release direction opposite to the movement direction.

15. The method according to claim 14 wherein the traveling body is moved in the release direction until the brake element that is held stationary and braked on the guide rail by the actuated friction-generating element is moved relative to the holder into a fixing position in which the pretensioning element is in a position corresponding to the deactivated configuration, and the release element transitions from the released state to the retaining state to retain the pretensioning element in the deactivated configuration.

* * * * *